(12) United States Patent
De Smet et al.

(10) Patent No.: US 9,886,474 B2
(45) Date of Patent: Feb. 6, 2018

(54) MULTIDIMENSIONAL GROUPING OPERATORS

(75) Inventors: Bart De Smet, Bellevue, WA (US); Henricus Johannes Maria Meijer, Mercer Island, WA (US); John Wesley Dyer, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/303,124

(22) Filed: Nov. 22, 2011

(65) Prior Publication Data

US 2013/0132333 A1    May 23, 2013

(51) Int. Cl.
*G06F 17/30*    (2006.01)

(52) U.S. Cl.
CPC .. *G06F 17/30412* (2013.01); *G06F 17/30592* (2013.01)

(58) Field of Classification Search
CPC .............. G06F 17/30412; G06F 17/30592
See application file for complete search history.

(56) References Cited

U.S. PATENT DOCUMENTS

| | | | | |
|---|---|---|---|---|
| 5,822,751 | A * | 10/1998 | Gray | G06F 17/30489 |
| 5,963,936 | A * | 10/1999 | Cochrane | G06F 17/30454 |
| 6,298,342 | B1 * | 10/2001 | Graefe et al. | 707/602 |
| 6,356,900 | B1 | 3/2002 | Egilsson et al. | |
| 7,035,843 | B1 * | 4/2006 | Bellamkonda | G06F 17/30489 |
| 7,392,248 | B2 | 6/2008 | Bakalash et al. | |
| 7,657,516 | B2 | 2/2010 | Zaman et al. | |
| 7,730,079 | B2 | 6/2010 | Meijer et al. | |
| 7,779,031 | B2 | 8/2010 | Grosset et al. | |
| 2004/0181538 | A1 * | 9/2004 | Lo et al. | 707/100 |
| 2006/0053103 | A1 * | 3/2006 | Chaudhuri | G06F 17/30489 |
| 2007/0208721 | A1 * | 9/2007 | Zaman et al. | 707/4 |
| 2008/0133492 | A1 * | 6/2008 | Meijer | G06F 17/30454 |
| 2009/0271382 | A1 * | 10/2009 | Vick | G06F 17/30412 |
| 2010/0121868 | A1 | 5/2010 | Biannic et al. | |
| 2010/0250575 | A1 | 9/2010 | Lukiyanov et al. | |
| 2011/0258179 | A1 * | 10/2011 | Weissman | G06F 17/30389 707/714 |

OTHER PUBLICATIONS

Gray et al., "Data Cube: A Relational Aggregation Operator Generalizing Group-By, Cross-Tab, and SubTotals", 1997, Kluwer Academic Publishers, Data Mining and Knowledge Discovery 1, pp. 29-53.*

Pearson, Bill, "Stairway to MDX—Step 1: Getting Started with MDX", Retrieved at http://www.sqlservercentral.com/articles/Stairway+Series/71867/, Mar. 2, 2011, pp. 8.

(Continued)

*Primary Examiner* — Jensen Hu

(57) ABSTRACT

A multidimensional object, such as a language-integrated query (LINQ) object, can be generated based upon a grouping set operator and zero or more key selectors. The object can be utilized to query over a non-relational data source. The object can include a sequence of functions corresponding to each grouping related to the grouping set operator in order to provide multidimensional grouping representation. Furthermore, the object includes nested structures for optimized execution of the grouping set operator.

19 Claims, 9 Drawing Sheets

(56) References Cited

OTHER PUBLICATIONS

Viswanathan, et al., "CAL: A Generic Query and Analysis Language for Data Warehouses", Retrieved at http://www.cise.ufl.edu/~mschneid/Research/papers/VS11SEDE.pdf>>, 20th International Conference on Software Engineering and Data Engineering (SEDE), Retrieved Date: Jul. 13, 2011, pp. 6.

"Tutorial: Introduction to Multidimensional Expressions (MDX)", Retrieved at http://www.fing.edu.uy/inco/grupos/csi/esp/Cursos/cursos_act/2005/DAP_SistDW/Material/2-SDW-Laboratorio1-2005.pdf, Retrieved Date: Jul. 13, 2011, pp. 33.

"International Search Report", dated Mar. 27, 2013, Application No. PCT/US2012/064590, Filed Date: Nov. 12, 2012, pp. 11.

Bonnet, et al., "Reduce, You Say: What no SQL can do for Data Aggregation and BI in Large Repositories" 2011 22nd International Workshop on Database and Expert Systems Applications (DEXA), Aug. 29, 2011, pp. 6.

Meijer, et al., "A Co-Relational Model of Data for Large Shared Data Banks", Communications of the ACM, vol. 54, No. 4, Apr. 2011, pp. 10.

Orend Kai., "Analysis and Classification of No SQL Databases and Evaluation of their Ability to Replace an Object-relational Persistence Layer", Software Engineering for Business Information Systems, Technical University of Munich, Master's Thesis, Apr. 2010, pp. 100.

"Third Office Action Issued in Chinese Patent Application No. 201210480057.7", dated May 5, 2016, 11 Pages.

"Supplementary Search Report Issued in European Patent Application No. 12851355.3", dated Jul. 7, 2015, 5 Pages.

"First Office Action Issued in Chinese Patent Application No. 201210480057.7", dated Feb. 28, 2015, 15 Pages.

"Second Office Action Issued in Chinese Patent Application No. 201210480057.7", dated Nov. 3, 2015, 6 Pages.

Qingmin, Yang, "Research and Implementation of Data Cube Techniques for OLAP Analysis of Network Security", a Thesis Submitted in Partial Fulfillment of the Requirements for the Degree of Master of Engineering in Computer Science and Technology, Nov. 2008, 7 Pages.

* cited by examiner

MULTIDIMENSIONAL GROUPING OPERATORS

BACKGROUND

Language-integrated query (LINQ), and supporting technology, provide a convenient and declarative shorthand query syntax (e.g., SQL-like) to facilitate specification of queries within a programming language (e.g., C#®, Visual Basic® . . . ). More specifically, query operators are provided that map to lower-level language constructs or primitives such as methods and lambda expressions. Query operators are provided for various families of operations (e.g., filtering, projection, joining, grouping, ordering . . . ), and can include but are not limited to "where" and "select" operators that map to methods that implement the operators that these names represent.

Typically, LINQ queries are specified and executed with respect to arbitrary collections of data such as, a relational store and/or a non-relational store. In a relational store or database, data is structured in terms of one or more tables. Tables are relations that comprise a number of columns and rows, wherein columns, referred to as attributes or dimensions, and rows, referred to as records, capture data for specific entity instances. In non-relational databases or key-value stores, non-relational databases or stores represent a simple data model that maps unique keys to a set of one or more values. More specifically, the non-relational database stores values and an index to facilitate location of the stored values based on a key.

In terms of relational data sources, a common implementation often includes Business Information (BI) analysis. For instance, an online analytical processing (OLAP) data source is a kind of relational data source that can receive and execute a query. OLAP data sources are beneficial in Business Information (BI) analysis based upon multidimensional capabilities and characteristics. Relational databases and, in particular, OLAP data sources typically include grouping operators such as "Rollup," and "Cube," among others, to summarize tables. Both "Rollup" and "Cube" are extensions of a "GroupBy" operator that allows data across records to be grouped by data in one or more columns, and is often utilized in conjunction with an aggregation function such as "Sum," "Count," "Min," or "Max." The "Rollup" operator computes multiple levels of any potential aggregate across specified columns or dimensions and also calculates a grand total. Such totals can be inserted as summarization rows. The "Cube" operator computes subtotals for all combinations of a set of provided grouping columns and thus generates all values produced by a "Rollup" operation plus values associated with additional combinations.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to multidimensional grouping operators. A grouping set operator can be extended to query arbitrary data sources including non-relational data sources. The grouping set operator can be translated into an object, and specifically, a multidimensional language-integrated query (LINQ) object that includes a sequence of functions. By translating the grouping set operator into a LINQ object with a sequence of functions, multidimensional queries can be executed on substantially any data source. In particular, grouping set operators can be translated into a LINQ object that includes a sequence of function(s) that respectively correspond to a data grouping based upon each key selector(s) dependent upon the type of grouping set operator implemented (e.g., grouping set operator that replicates a "Rollup" functionality, grouping set operator that replicates a "Cube" functionality, among others). Furthermore, the LINQ object can include nested structures that enable efficient fetching of query results.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
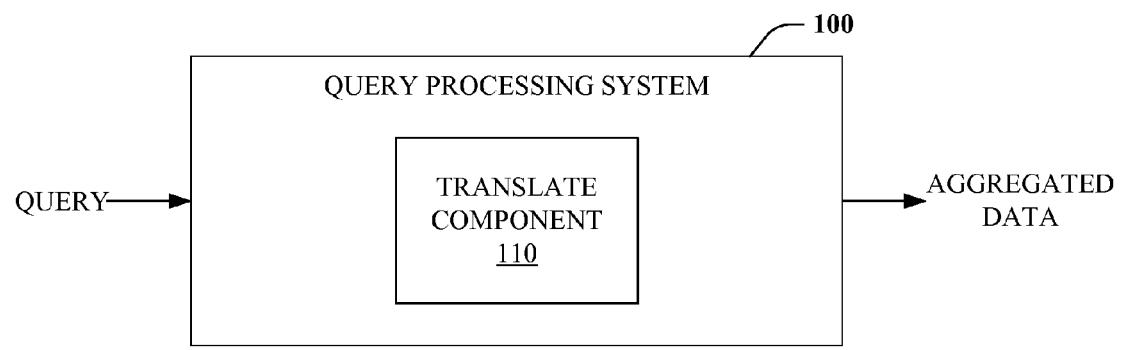
FIG. 1 is a block diagram of a query processing system.

Conventionally, a relational-database grouping operator aggregates data to produce a scalar result set in tabular form. As discussed above, "Rollup" and "Cube" are such grouping operators that aggregate data based upon particular key selectors, wherein the key selector references a column of rows in the relational database. These grouping operators solely allow for a tabular representation of data from the relational database. In light of this restriction of tabular data representation for "Rollup" and "Cube," execution of grouping operators results in excessive "NULL" values where no data is present due to the use of grouping and aggregation. However, these "NULL" values are not used to denote the absence of data in the source but rather a result due to a restriction of having to represent data in a "rectangular" way. For example, "NULL" values are conventionally inserted in places where data is absent in columns participating in grouping (e.g., "Rollup" and "Cube" can result in different rows that have "NULL" indicators). In general, conventional operators such as "Rollup" and "Cube" are restricted to relational databases, or relational data representations, and associated tabular representation, and inject confusing "NULL" values in results.

Details below are generally directed toward multidimensional grouping operators. In general, query operators, and more specifically grouping set operators, can operate over arbitrary data sources, including non-relational sources, and aggregate data based upon a key selector as well as enable multidimensional results. As discussed above, conventional grouping operators are specified with respect to, and execute on, a relational data source based upon a tabular data structure in which a key selector defines a grouping (e.g., aggregation) for data as well as being a reference for a column of rows in the relational data source. By extending grouping set operators to execute with any key selector (e.g., not just a reference for a column of rows), any arbitrary data source (e.g., relational data source, non-relational data source, among others) can be queried and multidimensional results can be produced.

In accordance with one aspect of the disclosure, grouping set operators can be translated into an object that includes a sequence of function(s) that respectively correspond to a data grouping based upon each key selector(s) dependent upon the type of grouping set operator implemented (e.g., "Rollup," "Cube," among others). By way of example and not limitation, the object can include a sequence of "GroupBy" function calls in order to return a data grouping for one or more key selectors targeted toward a particular data source. Such grouping set operators are not limited to relational data sources but can afford multidimensional results.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a query processing system 100 is illustrated. In general, the query processing system 100 can utilize a grouping set operator within a query that aggregates data based upon a key selector. The query processing system 100 can be configured to employ a grouping set operator that specifies data aggregation with respect to any arbitrary data source including non-relational as well as relational data sources. In particular, the query processing system 100 includes a translate component 110 that is configured to create an object that allows a multidimensional query to be handled and executed over an arbitrary data source (e.g., the object is discussed in more detail below). By way of example and not limitation, the object can be a multidimensional language-integrated query (LINQ) object which is a representation of the query (e.g., grouping set operator with a key selector). It is to be appreciated that any suitable programming language multidimensional object can be employed with the subject disclosure and a LINQ object is utilized as an example. The multidimensional object can be specified in a programming language such as, but not limited to, C#®, Visual Basic®, Java®, Ruby®, among others. As such, references herein to a LINQ object can also encompass any suitable programming language multidimensional object and is not intended to limit the subject matter to a LINQ style object. Such representation can be translated to any target data source, for example by way of a LINQ provider (not shown). In other words, a query that includes a grouping set operator provides a uniform representation that facilitates production of aggregated data across a plurality of distinct data sources.

The query processing system 100 enables data aggregation based upon a uniform representation (e.g., an object, a LINQ object, among others). This uniform representation can be employed with respect to substantially any data source which includes non-relational data sources and relational data sources. More specifically, the uniform representation can be translated or transformed into a data source specific representation for a query processing engine or the like. Such an engine can execute a query with respect to the uniform representation and, in turn, provide aggregated data accordingly. In particular, the uniform representation can be handled by an online analytical processing (OLAP) engine which extends the grouping set operator(s) to not only arbitrary data but also the Business Information (BI) data sources. In other words, the query processing system 100 can utilize OLAP style queries with a grouping set operator in order to provide precise data mining and/or drilling into arbitrary data sources.

The uniform representation facilitates querying large sets of data, and in particular large sets of BI data sources. For instance, in a business information analysis, a large set of data is desired to be drilled into for further analysis. This type of drilling into or drilling down into data is where the use of multidimensional groupings relates. By way of example, a user may analyze average sales figures on a yearly basis. The user may spot a weak year from the statistics gathered. The user may then want to drill down into average sales per year and per product category to further analysis the data and situation regarding the weak year. This process of data analysis can go on and on, exploring and mining the data set.

Figure 2:
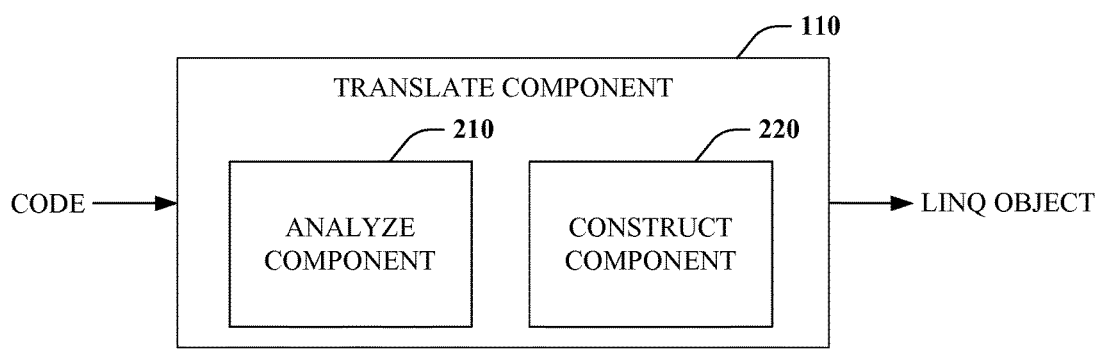
FIG. 2 is a block diagram of a representative translate component.

FIG. 2 illustrates a representative translate component 110 in further detail. The translate component 110 is configured to generate an object that allows a grouping set operator to perform data aggregation on any arbitrary data source. In other words, the following description in regards to the translate component 110 generates a uniform representation that can be handled by substantially any engines, query providers, and the like in order to produce query results from any data source. The translate component 110 further includes an analyze component 210 that is configured to analyze code. By way of example and not limitation, the code can include a query, a grouping set operator, a key selector, a target data source, among others. The analyze component 210 can identify the grouping set operator and at least one key selector. The translate component 210 further includes a construct component 220 that is configured to generate an object. The object can be any LINQ-based object yet is intended to include any object-oriented structure created in a programming language. Specifically, the object can be a multidimensional language-integrated query (LINQ) object (also referred to as "LINQ object"). In particular, the construct component 220 can create the LINQ object based upon the analyze component 210. Generally, any object-oriented structure that can be typed and/or can include a sequence of functions in which each function corresponds to a grouping of data defined by the grouping set operator to which the structure represents. It is to be appreciated that although a LINQ object is discussed herein, the subject disclosure is intended to include any object-oriented structure that can represent a grouping set operator.

Specifically, the construct component 220 generates the LINQ object to include a sequence of functions corresponding to the grouping set operator identified by the analyze component 210. The sequence of functions can define the multidimensional LINQ object such that each of the functions in the sequence corresponds to a grouping of data based upon a key selector or a combination of key selectors. A key selector is typically a reference to a column of rows in a relational data source. However, in accordance with the subject disclosure, a key selector as utilized herein, can relate to any function that defines a characteristic of which data is to be grouped in light of a grouping set operator. In other words, a key selector can be, but is not limited to being, a reference to a column of rows, a function, among others that a grouping set operator can execute to aggregate data. Accordingly, the multidimensional LINQ object can be created for the grouping set operator such that the multidimensional LINQ object represents the multidimensional query (e.g., grouping set operator with key selector for a target data source). Furthermore, the construct component 220 can include the "GroupBy" function for each of the sequence of functions. Thus, each grouping within the LINQ object for the grouping set operator is performed by a "GroupBy" function to aggregate data based upon the combination of key selectors. Such technique allows a multidimensional query to be executed on non-relational data (in addition to relational data) since such query is translated into a sequence of "GroupBy" functions.

In particular, a "Rollup" operator can produce a result set that represents aggregates for a hierarchy of values in the selected columns identified by the key selector. By way of example, the result set can include an empty grouping, a grouping by key selector$_1$, a grouping by composite key selector$_1$ and key selector$_2$, . . . , and a grouping by composite key selector$_1$, key selector$_2$, . . . , key selector$_N$, where "N" is a positive integer). Furthermore, a "Cube" operator can produce a result set that represents aggregates for all combinations of values in the selected columns identified by the key selector. By way of example, the result set can include all combinations such as an empty grouping, a grouping by key selector$_1$, a grouping by key selector$_2$, . . . , a grouping by key selector$_N$, where "N" is a positive integer, a grouping by composite key selector$_1$ and key selector$_2$, a grouping by composite key selector$_1$ and key selector$_3$, . . . , a grouping by composite key selector$_{N-1}$ and key selector$_N$, . . . , and grouping by composite key selector$_1$, key selector$_2$, . . . , and key selector$_N$.

For instance, a grouping set operator replicating the functionality of "Rollup" can be identified with key_selector$_1$ and key_selector$_2$ in which a corresponding LINQ object will include a sequence of three functions. The first function can be representative of a grouping of data that is the entire set of a target data source; the second function can be representative of a grouping of data that is based upon key_selector$_1$, and the third function can be representative to a grouping of data that is based upon key_selector$_1$ and key_selector$_2$. Based at least in part upon the grouping set operator utilizing a LINQ object with a sequence of "GroupBy" functions, such multidimensional query (e.g., here, "Rollup" with key_selector$_1$ and key_selector$_2$) can be executed on a non-relational data source.

It is to be appreciated that the grouping set operator dictates the combination of key selectors for groupings with the sequence of functions based upon the properties of such grouping set operator. By way of example and not limitation, the grouping set operator can replicate the functionality of a "Rollup" operator and/or a "Cube" operator. The grouping characteristics of "Rollup" and "Cube" in terms of relational data sources with key selectors that reference columns of rows is discussed above. The reference to "Rollup" and "Cube" relate to the properties of grouping data. It is to be appreciated that any suitable grouping set operator (e.g., "Rollup," "Cube," among others) can be employed with any suitable key selector combinations. In other words, the subject disclosure is intended to include any grouping set operator that creates groupings of data based upon key selectors in which the grouping set operator can utilize any combination of key selectors to create such groupings of data. Additionally, it is to be appreciated that any suitable function comparable to the "GroupBy" operator can be employed with the subject innovation.

Figure 3:
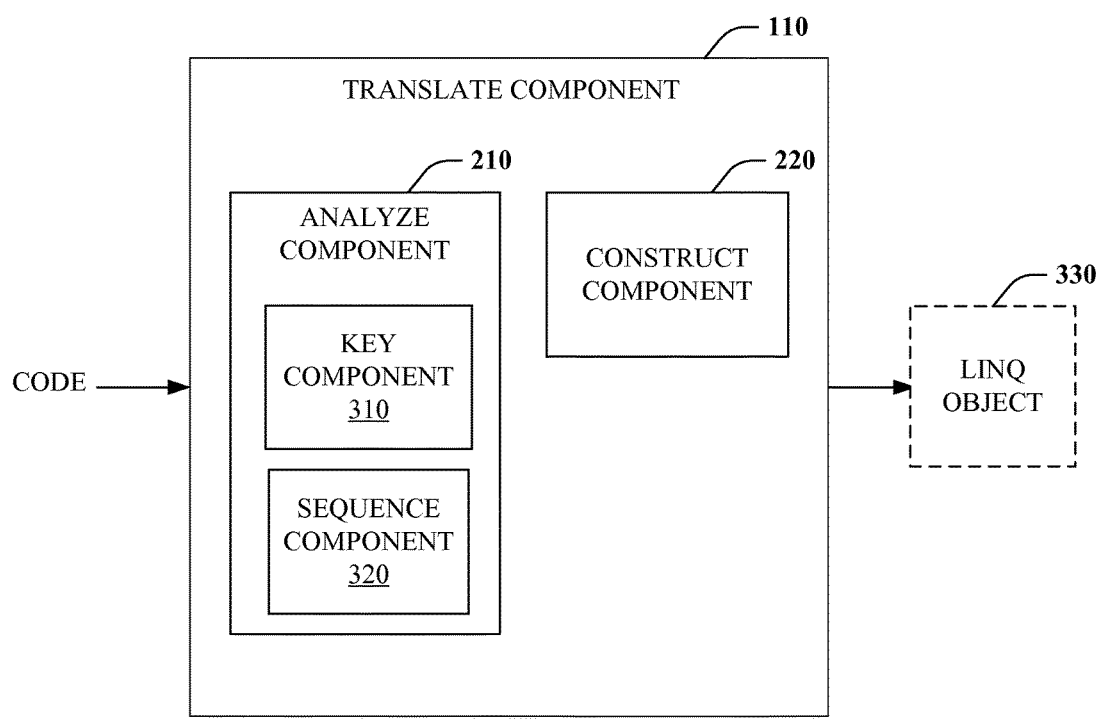
FIG. 3 is a block diagram of representative translate component.

FIG. 3 illustrates a representative translate component 110 in further detail that constructs a multidimensional language-integrated query (LINQ) object to execute with a non-relational data store. In general, the translate component 110 is configured to employ grouping set operator(s) that execute on a non-relational data in order to produce multidimensional query results.

The translate component 110 includes the analyze component 210 that is configured to identify a grouping set operator and at least one key selector from a portion of code. In particular, the analyze component 210 can include a key component 310. The key component 310 can collect the identified key selector(s) from the code. It is to be appreciated that the key component 310 can identify any suitable key selector(s) such as, but not limited to, key selector(s) that are functions.

The analyze component 210 further includes a sequence component 320 that is configured to analyze the grouping set operator and define a number of groupings for the grouping set operator and/or a combination of key selectors for each of the number of groupings. In other words, the key component 310 and the sequence component 320 can identify the kind of grouping set operator as well as the groupings of data defined by the grouping set operator. By way of example and not limitation, the analyze component 210 can ascertain the following for the identified grouping set operator: number of groupings based on the number of key selectors; combination of the key selectors that define each of the groupings, among others.

Continuing with FIG. 3, the construct component 220 can generate a multidimensional LINQ object (also referred to as LINQ object) 330. As discussed above, the LINQ object 330 can be created based at least in part upon the analyze component 210. In particular, the LINQ object 330 created for the grouping set operator includes a sequence of functions, wherein each of the functions in the sequence corresponds to a grouping of data based upon a key selector or a combination of key selectors. Generally, the LINQ object 330 includes a sequence of "GroupBy" functions. Thus, the multidimensional query is translated with the LINQ object 330 into a series of single dimension "GroupBy" functions such that each function corresponds to a grouping of data defined by a key selector or a combination of key selectors.

Moreover, the construct component 220 can include a type for each of the functions in the sequence (e.g., also referred to as each grouping of data based upon the key selector or combination of key selectors). In particular, the type of each function can correspond to the definition of the grouping of data. For example, in an example with two key selectors for a grouping set operator that replicates a "Cube" operation, a first type for a function in the sequence can be "Empty" to illustrate the grouping of data is all the data; a second type for a function in the sequence can be "First" to illustrate the grouping of data is based on the first key selector; a third type for a function in the sequence can be "Second" to illustrate the grouping of data is based on the second key selector; and a fourth type for a function in the sequence can be "Both" to illustrate the grouping of data is based upon the first key selector and the second key selector.

For instance, a grouping set operator of "Cube" can be identified with $key\_selector_1$, $key\_selector_2$, and $key\_selector_3$ in which a corresponding LINQ object will include a sequence of eight "GroupBy" functions. The first function can be representative of a grouping of data that is the entire set of the target data source; the second function can be representative of a grouping of data that is based upon $key\_selector_1$, the third function can be representative of a grouping of data that is based upon $key\_selector_2$, the fourth function can be representative of a grouping of data that is based upon $key\_selector_3$, the fifth function can be representative of a grouping of data that is based upon $key\_selector_1$ and $key\_selector_2$, the sixth function can be representative of a grouping of data that is based upon $key\_selector_1$ and $key\_selector_3$, the seventh function can be representative of a grouping of data that is based upon $key\_selector_2$ and $key\_selector_3$, and the eighth function can be representative of a grouping of data that is based upon $key\_selector_1$, $key\_selector_2$, and $key\_selector_3$.

Moreover, each of the functions (e.g., first function through eighth function) can be typed to identify the basis for each of the groupings (e.g., definitions of key selector combinations). Based at least in part upon the grouping set operator utilizing a LINQ object with a sequence of "GroupBy" functions, such multidimensional query (e.g., here, "Cube" with $key\_selector_1$, $key\_selector_2$, and $key\_selector_3$) can be executed on a non-relational data source.

Figure 4:
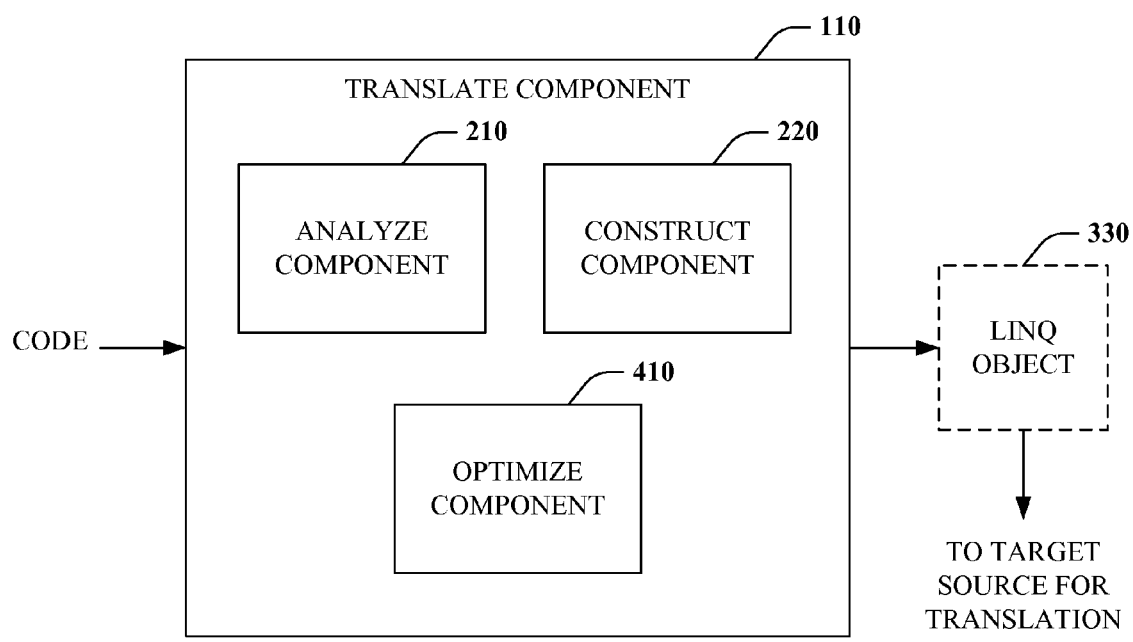
FIG. 4 depicts a block diagram of representative translate component.

FIG. 4 illustrates a representative translate component 110 in further detail that creates a nested structure within a LINQ object. The translate component 110 is configured to extend grouping set operators (e.g., "Rollup," "Cube," among others) to operate over non-relational data based in part upon the multidimensional LINQ object 330.

The LINQ object 330 can be a uniform representation that enables any engine, query provider, or data source to execute a portion of code that includes a grouping set operator. In general, the LINQ object 330 can be communicated to a target source for translation in a particular programming language corresponding to the programming language for such target source. Specifically, an engine, a query provider, or the data source directly can provide such translation of the uniform representation (e.g., the LINQ object 330) in order for the code to be executed. By way of example and not limitation, the LINQ object can be uniformly implemented with any query provider, OLAP engine, MDX engine, data source housing (discussed in more detail below) among others such that the LINQ object is translated for execution on a respective target data source.

The translate component 110 can further include an optimize component 410 that is configured to inject nested structures into the LINQ object 330 for efficient evaluation of queries (e.g., grouping set operator called with key selector(s) to a target data source). The optimize component 410 can order the groupings of data (e.g., grouping sets that are represented by a "GroupBy" function based on a key selector or a combination of key selectors) in a descending order to enable more specific groupings to be computed first. For instance, ordering groups by size (e.g., more key selectors leads to smaller groups) allows much smaller groups to be aggregated to bigger groups (e.g., eliminating one key selector amounts to aggregating all smaller subgroups). In other words, by computing a more specific grouping before less specific groupings, additional computed results can be obtained. This descending order computation enables the additional computed results to be produced which can later be implemented for lazy evaluations of future queries. By contrast, conventionally, in the relational world, one query typically needs to compute all results and cannot be partially lazy (e.g., asking a "Cube" will return all potential groupings—including the grouping containing all the elements—through a drill-down into the aggregated data may benefit from lazy evaluation (e.g., not requiring to fetch details of large groups)). In other words, the descending order computation produces the computations for specific groupings (which inadvertently computes more general groupings based on characteristics of a grouping set operator) such that when a query requests groupings that have been already computed due to the computation of specific groupings, the result for the query request can be directly provided (e.g., a lazy evaluation will not compute any additional computations necessary other than what is to be computed to provide a result). By way of example and not limitation, a specific grouping of SALES 590 for EMPID 570 from FIG. 5 can be computed which, based on the grouping set operator, will compute the more general groupings EMPID 550 and SALES 560 from FIG. 5. For an additional query requesting data from the more general groupings, a lazy evaluation can be implemented to provide results directly without additional computations based upon this descending order computation strategy.

For instance, a LINQ object for a grouping set operator can be constructed to include various composite groupings based upon the key selector(s), wherein the execution of the various composite groupings can be efficiently performed to expose additional results that can be nested within the LINQ object. In other words, fetching results for a particular composite grouping can produce additional results which are included within the nested structured in the LINQ object in order to increase efficiency in producing results for additional queries. As discussed above, this execution of the groupings based on descending order in order to glean additional results for future queries can be referred to as a "lazy evaluation."

Figure 5:
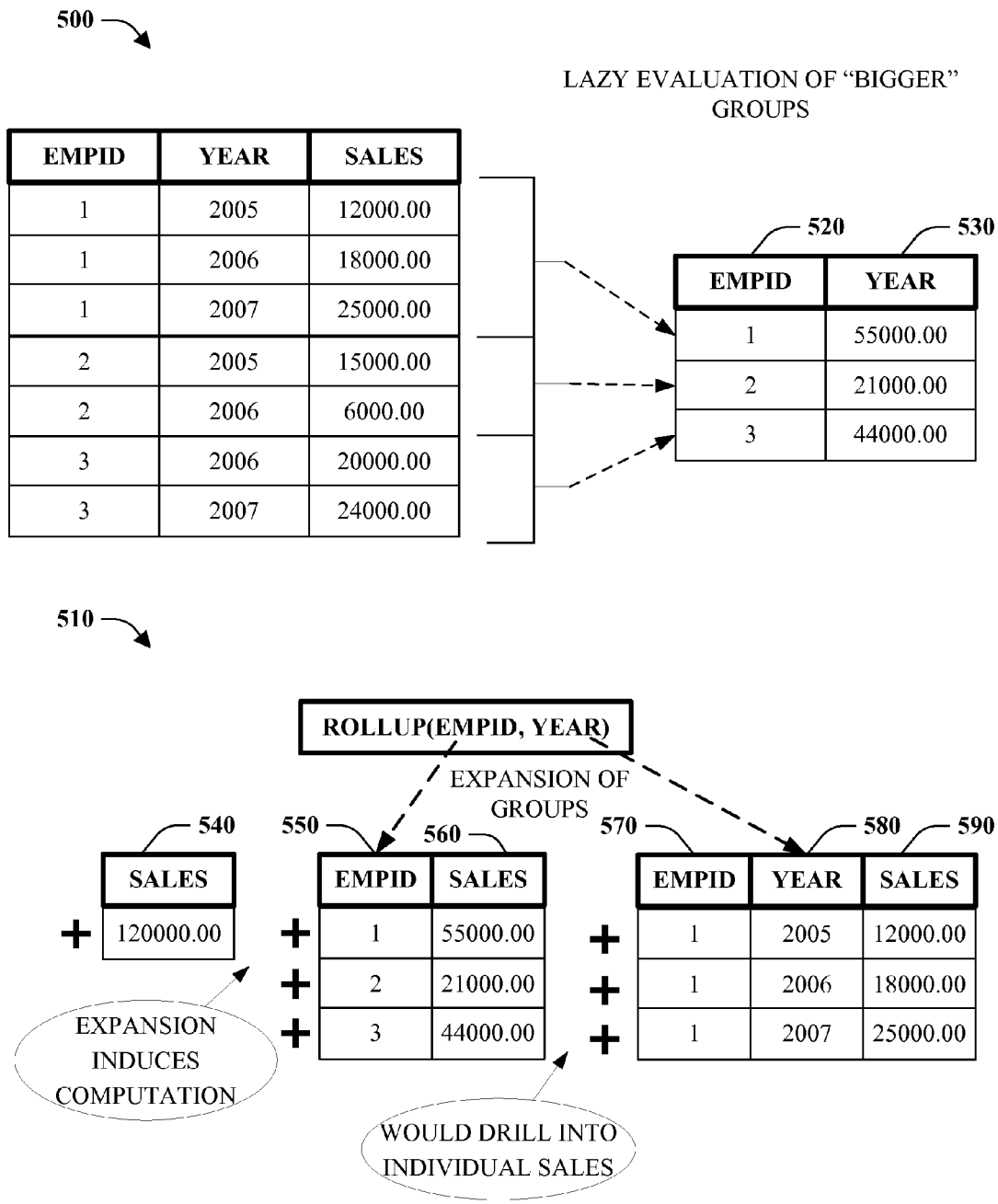
FIG. 5 depicts an exemplary data structure that is optimized to include nested structures.

Turning to FIG. 5, an exemplary data structure 500 that is optimized to include nested structures is depicted. The data structure 500 includes columns "EMPID," "YEAR," and "SALES." The nesting can enable such columns to be condensed into a more specific structure that includes EMPID 520 and YEAR 530. A data structure 510 illustrates a grouping set operator (here, "Rollup") based on the key selectors "EMPID" and "YEAR." The groups can be expanded as illustrated to include nested structures such that SALES 540 can be expanded to EMPID 550, and SALES 560 which can further be expanded (e.g., drilled into) to EMPID 570, YEAR 580, and SALES 590. The data structures 500 and 510 are discussed in more detail below.

Relational databases typically include grouping operators allowing aggregation of data by one or more columns. Additionally, relational databases offer the ability to create a union of multiple "grouping sets" in one statement. Such operators lack in more general querying outside the domain of relational databases and can be generalized to be applicable to more kinds of data. In addition, expressiveness of grouping sets in relational databases is limited due to the need to present data in a "tabular shape". Using object graphs, as described in this subject disclosure, this can be avoided.

Query operators for grouping data using various strategies can be built. The most general of those allows the formulation of grouping sets; more specific strategies to select grouping sets include "Rollup" and "Cube." Returned group objects permit easy analysis using object-oriented techniques, including a visitor model. The subject disclosure allows the following: formulation of grouping axis (e.g., grouping set operator replicating a "Rollup" or a "Cube") in query comprehension syntax (e.g., parameters thereof return an object of arity equal to the number of specified keys); translation of multidimensional groupings into regular ones; representation of composite groupings as object graphs; static typing for groups; generation of types to represent composite groupings, and associated operators; Online Analytical Processing (OLAP) style queries using LINQ; and translating multidimensional grouping operators to an Online Analytical Processing (OLAP) engine (e.g., the OLAP engine can be targeted toward multidimensional expressions (MDX), spreadsheet application analysis engines, among others). In particular, the formulation of grouping axis in query comprehension syntax (SQL-like syntactic sugar) can refer to utilizing grouping set operators on any arbitrary data source in comprehension syntax. Furthermore, the grouping set operators can be specified with respect to native syntax (e.g., doting into methods corresponding to operators).

Typical grouping constructs in LINQ involve a single key selector and produce a sequence of groups, each of which has a distinct key. Each such group includes a sequence itself, containing the elements of the group. As an example, enumerable sequences (e.g., series of pull-based data) can be discussed, although it is to be appreciated that everything is applicable to observable sequences (e.g., push-based data) as well. Below is the signature of the typical GroupBy operator:

```
static IEnumerable<IGrouping<K, T>> GroupBy<T, K>(this
IEnumerable<T> source, Func<T, K> keySelector);
```

Consuming the result of a "GroupBy" operation uses the key property on the IGrouping objects that are returned to analyze the key that comprises the current group. Since every IGrouping<K, T> is also IEnumerable<T>, the group's elements can be iterated over as follows:

```
var res = from p in products group p by p.Category;
    foreach (var g in res)
    {
        Console.WriteLine("Products in " + g.Key.Name);  // Here,
g.Key will be a "Category", whose Name property returns the name
        foreach (var p in g)
            Console.WriteLine("    " + p.Name);   // A group contains
elements, here products.
    }
```

Grouping is often used in conjunction with aggregation in order to compute statistics about each individual group. An example is shown below, where the average price per group is computed from the product catalog:

```
var res = from p in products group p by p.Category into g select new
{ Category = g.Key, Avg = g.Average(p => p.Price) };
```

In quite some analysis scenarios, one wants to drill down into a large set of data in order to analyze it further. This is where the use of multi-dimensional groupings comes in. For example, one may want to see average sales figures on a yearly basis. Spotting a weak year from the statistics gathered, the next question may be to drill down into average sales per year and per product category. This process of data analysis can go on and on, exploring and mining the data set.

As discussed, relational databases have provided ways to automate this repeated grouping processing in which the keys of the computed groups vary in several ways. The selection of combinations of keys to group on can be referred to as a "strategy" in what follows. Two strategies are common, as explained below:

---

ROLLUP of a set of keys $k_1, ..., k_n$ involves (where "n" is a positive integer):
    the group with an empty key (i.e. the data itself)
    grouping by $k_1$
    grouping by composite key $k_1, k_2$
    ...
    grouping by composite key $k_1, k_2, ..., k_n$
CUBE of a set of keys $k_1, ..., k_n$ involves (where "n" is a positive integer):
    the group with an empty key (e.g., the data itself)
    grouping by $k_1$
    grouping by $k_2$
    ...
    grouping by $k_n$
    grouping by composite key $k_1, k_2$
    grouping by composite key $k_1, k_3$
    ...
    grouping by composite key $k_{n-1}, k_n$
    ...
    grouping by composite key $k_1, k_2, ..., k_n$

---

In other words, the "Rollup" operator builds incremental groups given a list of keys. For "n" keys, a total of "n" groups are built, starting with a single-key group up to the group based on all the keys. "Cube" creates all possible unique combinations of keys from the given list (e.g., groups with a single key, groups with two keys, and so on and so forth).

The generalization of both operators is the concept of a GROUPING SETS, where the user specifies sets of keys to group on. For example, a "Rollup" of keys $k_1, \ldots, k_n$ corresponds to:
GROUPING SETS (( ), $(k_1)$, $(k_1, k_2)$, . . . , $(k_1, k_2, \ldots, k_n)$)

After creating constituent groups that comprise a multi-dimensional grouping strategy, results are unioned and presented as a whole. This is where problems start occurring with conventional techniques, as the relational model only allows for a tabular representation of data. As a result, one is faced with excessive "NULL" values that end up in places where no data is present due to the use of grouping and aggregation. This is unfortunate as the meaning of "NULL" is not solely used to denote the absence of data in the source anymore. An example is shown below:

SELECT EmpId, Year, SUM(Sales) AS Sales
FROM Sales
GROUP BY ROLLUP(EmpId, Year)

| EmpId | Year | Sales |
|---|---|---|
| 1 | 2005 | 12000.00 |
| 1 | 2006 | 18000.00 |
| 1 | 2007 | 25000.00 |
| 1 | NULL | 55000.00 |
| 2 | 2005 | 15000.00 |
| 2 | 2006 | 6000.00 |
| 2 | NULL | 21000.00 |
| 3 | 2006 | 20000.00 |
| 3 | 2007 | 24000.00 |
| 3 | NULL | 44000.00 |
| NULL | NULL | 120000.00 |

The "NULL" value for Year in the fourth row does not indicate sales by employee 1 in an unknown year. Rather, it represents the result of grouping the sales table by EmpId, resulting in a total sales figure of 55,000.00 across all years. In other words, the "NULL" here is a placeholder for "all years" and an artifact of the need to represent data in a tabular "rectangular" way. Similarly, the last row has two "NULL" values in it to denote the overall group's aggregate across all the data.

For completeness and illustrative purposes, the query shown above boils down to the following equivalent use of "GROUPING SETS" specified in SQL:

```
SELECT EmpId, Year, SUM(Sales) AS Sales
FROM Sales
GROUP BY GROUPING SETS((EmpId, Year), (EmpId), ( ))
```

Use of a "Cube" operation in the preceding sample would also result in groups per Year (e.g., across all employees). The equivalent in terms of "GROUPING SETS" formulation would be the same as the one shown above, with the addition of a (Year) group.

As discussed above and throughout the subject disclosure, grouping operators for relational data sources have numerous flaws and drawbacks. Specifically, the grouping operators, such as "Rollup" and "Cube" generate confusing uses of "NULL" values in a result tabular structure. Additionally, the relational data structures and the grouping operators are restricted to tabular data representations. Moreover, the execution of such grouping operators does not afford any employment of a lazy evaluation (discussed above). In a relational database setting, using grouping statements across different axis incurs evaluation of all the grouping operations carried out over the data set. As discussed in FIG. 4, evaluating groups lazily allows room for performance optimization to be created. By ordering grouping key sets based on the number of keys in a set in a descending order, the more specific groups (e.g. EmpId and Year) can be computed first. Such specific groups contribute to larger groups (e.g. by EmpId only), which can be produced based on already computed results. For example, for a Sum aggregate on a less specific group, it suffices to compute the more specific groups that belong to the less specific one and sum up their intermediate aggregates.

Optimizations as the one shown above require "whole query expression" analysis with knowledge of aggregation behavior. However, such analysis seems worthwhile for large sets of data to avoid excessive re-iteration. An example of non-trivial state tracking utilized for lazy evaluation of aggregates across groups with maximum reuse of subresults is Average. In order to merge the average of "more specific" groups (e.g. EmpId and Year) into the average for a "less specific" group (e.g. EmpId only, across all Year values), keeping track of individual group sums as well as element counts is as follows:
Average(g1 U g2)=(g1.Sum+g2.Sum)/(g1.Count+g2.Count)
Such evaluation is only needed if the user really requests the group during iteration, which could be triggered by a data analysis user interface where the user "rolls up" results. (See, for example, data structure 500 in FIG. 5).

Another kind of optimization permitted goes in the opposite direction where "less specific" groups (e.g., with a small key count but hence with a large element count) results are fetched first. When the user decides to drill into a group to perform a breakdown of aggregation results, subgroups (which are "more specific" in a sense they add keys and represent subsets of the original group's data) may be fetched lazily. Descending "into" the data in such a manner could benefit from a predefined grouping sets, e.g. in a "Rollup" scenario.

For example, first the user sees the grand total of sales across all employees and across all years. Because a grouping strategy was defined earlier on—assume ROLLUP(EmpId, Year)—expanding such group does not immediately yield all the group's elements of the original data set. Instead, "descending" one level allows the presentation of sales figure on a per-employee basis. This strategy would work especially well in a distributed setting where downloading excessive amounts of data is to be avoided simply to aggregate on the client. Since the user has formulated a "recipe" for the "grouping strategy", grouping aggregates can be gradually computed and only fetch their subgroups (potentially all the way down to the individual rows from the original data set) upon request. (See, for example, data structure 510 in FIG. 5)

The following is an exemplary implementation of "Rollup" and "Cube." A direct implementation of the Rollup and Cube operators over sequences (e.g., enumerable or observable, though for sake of brevity the former is illustrated) is possible as shown below. Internally, those operators can leverage the classic "GroupBy" operator. The essential difference lies in the fact that Rollup and Cube realize a grouping strategy by making different calls to "GroupBy" and returning a sequence that allows one to fetch all of those contributing groups.

"Cube" is illustrated as an example here. It is to be appreciated that "Rollup" is very similar and differs solely in the key combinations made based on the given key selector functions. Below is "Cube" as an example:

```
public static IEnumerable<CompositeGrouping<K1, K2, T>> Cube<T,
K1, K2>(this IEnumerable<T> source, Func<T, K1> keySelector1,
Func<T, K2> keySelector2)
{
    yield return new CompositeGrouping<K1, K2, T>.Empty { Elements
= source };
    yield return new CompositeGrouping<K1, K2, T>.First { Elements =
source.GroupBy(keySelector1) };
    yield return new CompositeGrouping<K1, K2, T>.Second { Elements
= source.GroupBy(keySelector2) };
    yield return new CompositeGrouping<K1, K2, T>.Both { Elements =
source.GroupBy(x => new Tuple<K1, K2>(keySelector1(x),
keySelector2(x))) };
}
```

Notice how a "tuple" is used for the key used in the "Both" group, representing a group with a compound key. Unfortunately, the language does not have a means to cook up a "full fidelity" type with meaningfully named properties based on the original key selector(s). This is no different from the classic "GroupBy" operator where the IGrouping<K, T> objects that are returned have a property called "Key" which by itself does not say much. To extract the key values from the "Both" group, the user will have to decompose the "tuple" object using the Item1 and Item2 properties.

The "CompositeGrouping" types shown here implement a discriminated union type in, for example, C#® (which is not natively supported by the language, hence a pattern of subtyping is followed). The Empty, First, Second and Both types refer to the keys that belong to the group. First, the definition of the composite grouping classes is shown as follows:

```
abstract class CompositeGrouping<K1, K2, T>
{
    public class First : CompositeGrouping<K1, K2, T>,
                IGrouping<CompositeKeyPowerTwoType,
IGrouping<K1, T>>
    {
        public IEnumerator<IGrouping<K1, T>> GetEnumerator( );
        public IEnumerable<IGrouping<K1, T>> Elements { get;
        set;
    }
        public override CompositeKeyPowerTwoType Type
        {
            get { return CompositeKeyPowerTwoType.First; }
        }
    }
    ...
    public abstract CompositeKeyPowerTwoType Type { get; }
}
```

For the sake of brevity, the implementation of Second, Both and Empty is omitted in the above, based upon substantial similarities. Notice the use of an enumeration value to indicate the type of the composite key, allowing for easier switching on the type. Based on the Type property, one can figure out which grouping keys define the group. Each "CompositeGrouping" object implements the "IGrouping" interface with the key of the groups used as an indicator of the type of group (e.g., Empty, First, Second, Both). The elements of each such group are groupings themselves, this time based on the selected key(s).

For example, creating a "Cube" on EmpId and Year over the sales data sample would result in four composite groups being yielded from the "Cube" operator. The first is the group that will fetch all of the sales elements, as no grouping is carried out:

```
yield return new CompositeGrouping<K1, K2, T>.Empty { Elements =
source };
```

The second and third groups that are produces perform grouping based on EmpId and Year, respectively:

```
yield return new CompositeGrouping<K1, K2, T>.First { Elements =
source.GroupBy(keySelector1) };
    yield return new CompositeGrouping<K1, K2, T>.Second {
Elements = source.GroupBy(keySelector2) };
```

The fourth group is as follows:

```
yield return new CompositeGrouping<K1, K2, T>.both { Elements =
source.GroupBy(x => new Tuple<K1, K2>(keySelector1(x),
keySelector2(x))) };
```

Taking a look at the type of CompositeGrouping<K1, K2, T>, one can see it implements the IGrouping interface as follows:

```
public class First : CompositeGrouping<K1, K2, T>,
    IGrouping<CompositeKeyPowerTwoType, IGrouping<K1, T>>
```

In the above, the "grouping key" simply reveals the kind of group (e.g., "First"). The elements are all of the groups based on key "K1," in the sample that is EmpId. In other words, enumerating over the "First" group will result in all the groups based on EmpId.

The following is an exemplary discussion in regards to grouping with higher arity. Previous discussions covered grouping sets generated from two key selectors. Higher arity groups can provide overloads that take more key selectors, hence have more generic parameters. As a result, more "CompositeGrouping" types have to be defined as well, accounting for all the possible key combinations. This leads to an explosion of types. It is to be appreciated and understood that at some level of arity, dynamic typing can be employed for higher arities. This technique can form a balance between the degree of static typing and the number (and hence size) of types required.

The type encodes the kind of composite group in a statically typed manner. In other words, the shape of the data is shifted into the type as opposed to (mis)using special data values to indicate the shape. For example, after Sum aggregation of sales value:

| EmpId | Year | Sales | Our type |
|---|---|---|---|
| 1 | 2005 | 12000.00 | Both |
| 1 | 2006 | 18000.00 | Both |
| 1 | 2007 | 25000.00 | Both |
| 1 | NULL | 55000.00 | First |
| 2 | 2005 | 15000.00 | Both |
| 2 | 2006 | 6000.00 | Both |
| 2 | NULL | 21000.00 | First |
| 3 | 2006 | 20000.00 | Both |
| 3 | 2007 | 24000.00 | Both |
| 3 | NULL | 44000.00 | First |
| NULL | NULL | 120000.00 | Empty |

It is to be appreciated that for the remainder of this disclosure and for the sake of brevity, arity 2 will be described.

The following relates to making consumption of data easier. Consuming the "CompositeGrouping" sequence can be quite hard due to the need to check the Type, perform a cast to the discriminated union's most specific type and finally enumerating the groups inside it. To make this process easier, "Accept" methods can be provided to dispatch based on a type. It is to be appreciated that different such methods can be thought of, but their essence is the same. The subject disclosure is intended to include any suitable methods similar to "Accept" and the "Accept" method is not to be limiting on the subject disclosure.

Based on the type of the composite grouping object given to Accept, it performs the right cast and feeds the resulting object to a strongly typed function in order to invoke some action (void-returning) or to produce some result (generically typed R). Based on this, the result of a "Cube" or "Rollup" can be included in a bigger query expression and be composed in a functional manner further on. Below is an exemplary "Accept" method:

```
public R Accept<R>(
        Func<CompositeGrouping<K1, K2, T>.Empty, R> empty,
        Func<CompositeGrouping<K1, K2, T>.First, R> first,
        Func<CompositeGrouping<K1, K2, T>.Second, R> second,
        Func<CompositeGrouping<K1, K2, T>.Both, R> both)
{
    var result = default(R);
    switch (Key)
    {
        case CompositeKeyPowerTwoType.Empty:
            result = empty((CompositeGrouping<K1, K2,
                T>.Empty)this);
            break;
        case CompositeKeyPowerTwoType.First:
            result = first((CompositeGrouping<K1, K2,
```

-continued

```
            T>.First)this);
            break;
        case CompositeKeyPowerTwoType.Second:
            result = second((CompositeGrouping<K1, K2,
                T>.Second)this);
            break;
        case CompositeKeyPowerTwoType.Both:
            result = both((CompositeGrouping<K1, K2,
                T>.Both)this);
            break;
    }
    return result;
}
```

This method switches on the type and invokes the corresponding function. Here, the user specifies four functions as delegates to map the composite group object onto a result of type R.

An alternative is to represent the four composite grouping types in a way that is more natural to users familiar with the relational model, where the absence or presence of a key is indicated in some way. In the relational model, this would be done by "hijacking" a column's value by setting it to "NULL." Since this kind of confusion is something that is to be avoided, a "MultiKeyGrouping" object is created instead, using Boolean properties to indicate presence or absence of keys. In other words, the four types are turned back into one type with Boolean values encoding the shape of the data:

```
public IEnumerable<R> Accept<R>(Func<MultiKeyGrouping<K1, K2,
T>, R> selector)
{
    return Accept(
        e => new[ ] { selector(new MultiKeyGrouping<K1, K2, T>(
                false, default(K1), false, default(K2), e)) },
        f => from x in f
            select selector(new MultiKeyGrouping<K1, K2, T>(
                true, x.Key, false, default(K2), x)),
        s => from x in s
            select selector(new MultiKeyGrouping<K1, K2, T>(
                false, default(K1), true, x.Key, x)),
        b => from x in b
            select selector(new MultiKeyGrouping<K1, K2, T>(
                true, x.Key.Item1, true, x.Key.Item2, x))
    );
}
```

The above also illustrates another possible return type for an "Accept" method, this time returning an enumerable sequence instead of a scalar value. This also is closer to the relational model where the structure of composite groups gets flattened out. Now the selector function passed to "Accept" is presented with a "MultiKeyGrouping" of arity two, as shown below:

```
class MultiKeyGrouping<K1, K2, T> : IEnumerable<T>
{
    private IEnumerable<T> _elements;
    internal MultiKeyGrouping(bool hasKey1, K1 key1, bool
hasKey2, K2 key2,
            IEnumerable<T> elements)
    {
        _elements = elements;
        HasKey1 = hasKey1;
        Key1 = key1;
        HasKey2 = hasKey2;
        Key2 = key2;
    }
```

```
    public bool HasKey1 { get; private set; }
    public K1 Key1 { get; private set; }
    public bool HasKey2 { get; private set; }
    public K2 Key2 { get; private set; }
    public IEnumerator<T> GetEnumerator( )
    {
        return _elements.GetEnumerator( );
    }
}
```

This allows the user to write a query where all the groups in a "Cube" or "Rollup" are created and get represented as "MultiKeyGrouping" objects to a function in order to post-process them. An example could be printing them in a relational-alike form based on the HasKey property values (e.g. printing "*" for an absent key, rather than reusing "NULL").

To make things even simpler, a Select operator overload is provided that is specialized for the "Cube" and "Rollup" grouping operators result type, using "Accept" behind the scenes:

```
public static IEnumerable<R> Select<T, K1, K2, R>(
        this IEnumerable<CompositeGrouping<K1, K2 , T>> source,
        Func<MultiKeyGrouping<K1, K2 , T>, R> selector)
{
        return source.Select(x => x.Accept(selector)).SelectMany(x =>
x);
}
```

In other words, the result of a "Cube" or "Rollup" operation internally is still based on "CompositeGrouping" discriminated union objects, but when followed by a Select operator, it gets surfaced—transparently—as a MultiKeyGrouping. Now, the following can be utilized:

```
var res = from g in sales.Rollup(s => s.EmpId, s => s.Year)
    select new
    {
        EmpId = g.HasKey1 ? g.Key1 : "*",
        Year = g.HasKey2 ? g.Key2 : "*",
        Sales = g.Sum(a => a.Sales)
    };
```

Here, range identifier "g" stands for the individual groups represented as MultiKeyGrouping objects. The HasKey properties are used to map the data onto a "missing data" literal or the value itself. The use of "*" to denote the absence of a key in fact reflects the true meaning quite well: the "row" represents the aggregate of "all (*)" elements disregarding this column. The above produces the following data:

| EmpId | Year | Sales |
|---|---|---|
| 1 | 2005 | 12000.00 |
| 1 | 2006 | 18000.00 |
| 1 | 2007 | 25000.00 |
| 1 | * | 55000.00 |
| 2 | 2005 | 15000.00 |
| 2 | 2006 | 6000.00 |
| 2 | * | 21000.00 |
| 3 | 2006 | 20000.00 |
| 3 | 2007 | 24000.00 |
| 3 | * | 44000.00 |
| * | * | 120000.00 |

However, the expressiveness of this kind of query now stretches beyond relational. Notice—as mentioned earlier—the selected keys are shadowed by names like Key1 and Key2, which is a bit unfortunate. One could envision an advanced type system where the name of the selected keys "leaks" throughout the query expression somehow. As another remark, the use of Boolean values to denote absence of a key could in fact be substituted for the use of Nullable<T>, if it were not for the fact this type cannot be nested on the common language runtime (CLR), nor does it work in conjunction with reference types. Use of an Option<T> type that lifts those restrictions would be another option to encode the keys or the absence thereof (e.g. with an Option<K1> Key1 property).

The following relates to overloading "GroupBy" query expression clauses for "Rollup" and "Cube" (e.g., as referred to above). Here, focus is on how to allow a user to use the GroupBy keyword to express the roll-up rather than having to rely on extension method syntax with lambda expressions for key selectors. Examples of such are shown below:

```
var res = from s in sales
    group s by Rollup.Axis(s.EmpId, s.Year) into g
    select new
    {
        EmpId = g.HasKey1 ? g.Key1 : "*",
        Year = g.HasKey2 ? g.Key2 : "*",
        Sales = g.Sum(a => a.Sales)
    };
```

To enable this syntax, an overload is added to GroupBy that looks as follows:

```
static IEnumerable<CompositeGrouping<K1, K2, T>> GroupBy<T, K1, K2>(
    this IEnumerable<T> source,
    Expression<Func<T, RollupAxis<K1, K2>>> keySelector)
```

In here, Rollup can be a keyword to further specify the kind of group that is meant to be created. Parameters to the static Axis method return a RollupAxis generic object of arity equal to the number of specified keys (e.g., for the sake of brevity, arity two is illustrated but any arity can be employed). The RollupAxis type and the Axis method look as follows:

```
class RollupAxis<K1, K2>
{
}
static class Rollup
{
    public static RollupAxis<K1, K2> Axis<K1, K2>(K1 key1, K2 key2)
    {
        throw new NotSupportedException("Only use in a query expression.");
    }
}
```

The implementation of this is trivial and is meant as a way for the user to express intent, which gets captured in an expression tree as revealed by the GroupBy signature as seen below:
Expression<Func<T, RollupAxis<K1, K2>>> keySelector
Similarly, a "GroupBy" method with a keySelector expression for a function returning a CubeAxis can be provided, allowing the user to construct a cube using Cube. Axis( . . . ).

Inside those GroupBy methods, the expression tree written by the user can be analyzed to create functions that can be fed to the lower level grouping methods "Cube" and "Rollup." Those key selector expressions could be totally invalid, warranting runtime checking. For example, the user could write Rollup.Axis(42, "Foo"), which could be considered not to have any meaning at all (as no properties of the source element type are used). Deciding which expressions are valid is left as a task for query providers; for the "local" variants of the operators what the user wrote is blindly executed. For example, take the following:

```
public static IEnumerable<CompositeGrouping<K1, K2, T>> GroupBy<T, K1, K2>(
    this IEnumerable<T> source,
    Expression<Func<T, RollupAxis<K1, K2>>> keySelector)
{
    var mce = (MethodCallExpression)keySelector.Body;
    var ftions = (from arg in mce.Arguments
        select Expression.Lambda(arg,
        keySelector.Parameters[0]).Compile( ))
            .ToList( );
    var key1 = (Func<T, K1>)ftions[0];
    var key2 = (Func<T, K2>)ftions[1];
    return source.Rollup(key1, key2);
}
```

Overloads with a higher arity can be constructed in a similar manner. The operation of the code can be as described herein. First the Rollup or Cube is accepted to be formulated using a static Axis method. This is not check above for brevity. Next, all of the parameters passed to this method are re-parented inside lambda expressions. For example, consider the original query:

```
var res = from s in sales
    group s by Rollup.Axis(s.EmpId, s.Year) into g
    select new
    {
        EmpId = g.HasKey1 ? g.Key1 : "*",
        Year = g.HasKey2 ? g.Key2 : "*",
        Sales = g.Sum(a => a.Sales)
    };
```

This gets turned into:

```
var res = sales
    .GroupBy(s => Rollup.Axis(s.EmpId, s.Year))
    .Select (g => new
    {
        EmpId = g.HasKey1 ? g.Key1 : "*",
        Year = g.HasKey2 ? g.Key2 : "*",
        Sales = g.Sum(a => a. Sales)
    });
```

The underlined part gets now translated into:

```
var res = sales
    .Rollup(s => s.EmpId, s => s.Year)
    .Select(g => new
    {
        EmpId = g.HasKey1 ? g.Key1 : "*",
        Year = g.HasKey2 ? g.Key2 : "*",
        Sales = g.Sum(a => a.Sales)
    });
```

The "Rollup" and "Cube" operators presented in the subject disclosure can be generalized into "grouping sets". Given any arity with regards to the number of keys to define groups over, the concept of a grouping set is to return a sequence of group constructors. For example, look back at the definition of "Cube:

```
public static IEnumerable<CompositeGrouping<K1, K2, T>> Cube<T,
K1, K2>(this IEnumerable<T> source, Func<T, K1> keySelector1,
Func<T, K2>
keySelector2)
{
    yield return new CompositeGrouping<K1, K2, T>.Empty {
Elements =source };
    yield return new CompositeGrouping<K1, K2, T>.First { Elements =
source.GroupBy(keySelector1) };
    yield return new CompositeGrouping<K1, K2, T>.Second {
Elements = source.GroupBy(keySelector2) };
    yield return new CompositeGrouping<K1, K2, T>.Both { Elements =
source.GroupBy(x => new Tuple<K1, K2>(keySelector1(x),
keySelector2(x))) };
}
```

The generalization of this function is to have GroupingSet<T, K1, . . . , Kn> methods that return a sequence of functions that return CompositeGrouping< K1, . . . , Kn, T> objects. One input to those functions is the source, an IEnumerable<T>. Another is the set of key selectors fed to the GroupingSet operator.

In fact, such an operator does not provide much benefit over stating the intended GroupBy calls directly and union or concatenate them together by using pre-defined CompositeGrouping objects. Code for such those composite grouping discriminated union types can be generated.

Capturing the user intent of a "Rollup," "Cube" or "GroupingSet" operator can be done using expression trees. Evaluation of the results can be split across the yielded groups. This reflects the optimizations mentioned before. For example, a CompositeGrouping object by itself implements an IGrouping and IEnumerable interface which both can be evaluated lazily. By returning an implementation of such a type with lazily evaluated logic behind enumeration (or subscription) methods allows scenarios as shown in FIG. 4.

Similar to LINQ to SQL that translates regular relational queries to SQL for improved execution efficiency, the operators described in the subject disclosure can be mapped to OLAP specific engines such as multidimensional expressions (MDX), spreadsheet application analysis engines, among others). This extends the reach of LINQ to classic analysis and business information (BI) scenarios.

Figure 6:
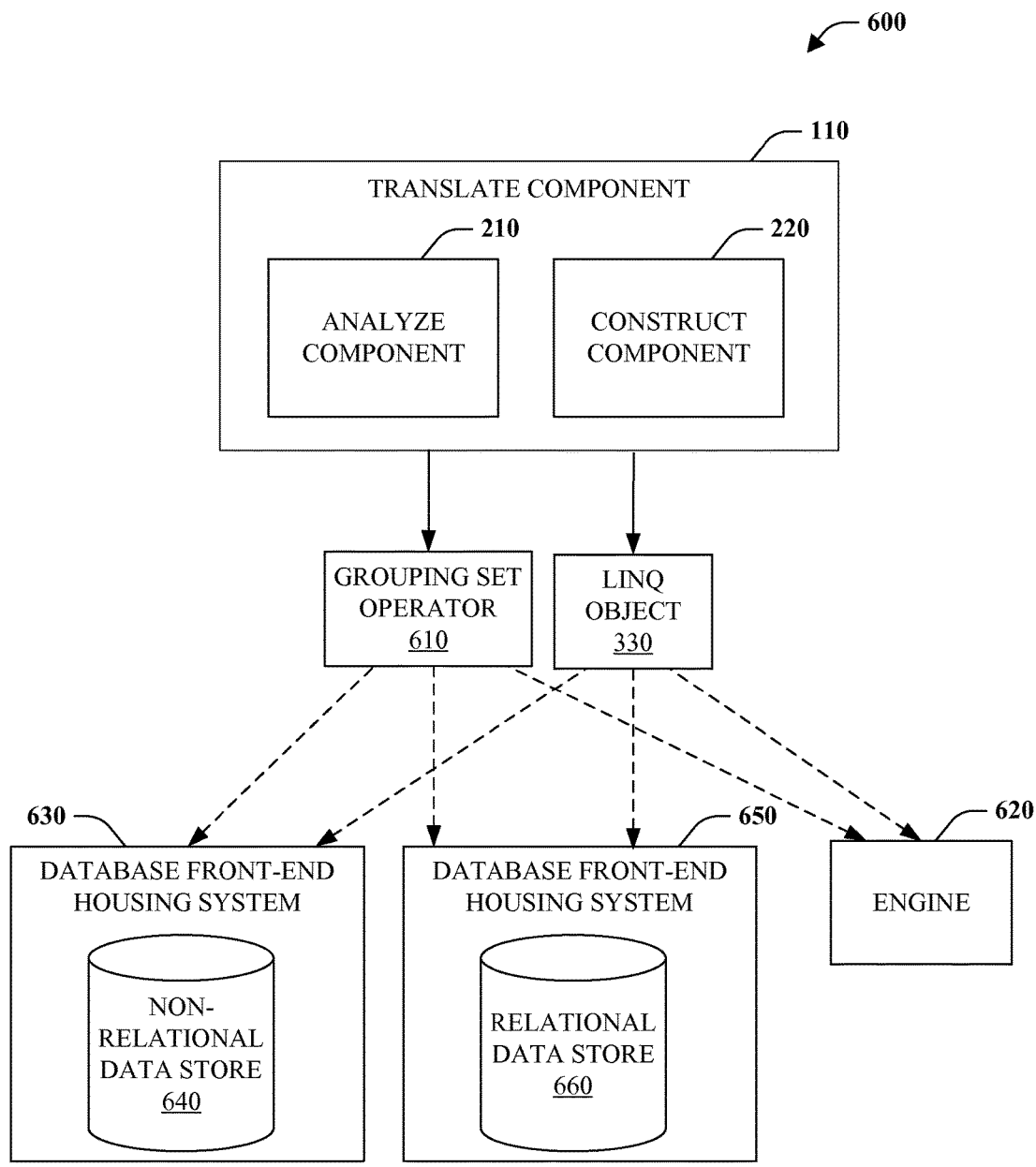
FIG. 6 is a block diagram of a system that facilitates executing a grouping set operator on arbitrary data stores.

FIG. 6 is a system 600 that facilitates executing a grouping set operator on arbitrary data stores. The system 600 includes the translate component 110 that aggregates data with a grouping set operator 610 based upon a target source and at least one key selector. In general, as discussed above, the translate component 110 includes the analyze component 210 and the construct component 220 that are configured to generate a multidimensional LINQ object 330 based on the grouping set operator 610 and key selector(s).

The system 600 can include an engine 620 that can be configured to process the grouping set operator 610 and/or the LINQ object 330. It is to be appreciated that the grouping set operator 610 can include the LINQ object 330 and the LINQ object 330 can be a representation of the group set operator 610. However, the subject disclosure is intended to include the employment of either the grouping set operator 610 and/or the LINQ object 330 to enable an engine, query provider, and/or a data source for execution. In other words, the grouping set operator 610 and/or the LINQ object 330 can be communicated to a data source for employment in order to generate query results. In particular, it is to be appreciated that the translate component 110 can create grouping set operators that can be mapped to any suitable engine 620 in order to process such data requests or querying. For instance, the engine 620 can be an OLAP engine, a multidimensional expressions (MDX) engine, spreadsheet application analysis engines, business information (BI) engines, among others. Overall, the grouping set operator 610 created based upon the multidimensional LINQ object 330 can be mapped to any suitable engine in which such queries can be handled.

Generally, the grouping set operator 610 and corresponding LINQ object 330 can be uniformly handled and executed by any arbitrary data source, engine, query provider (not shown), among others. Specifically, grouping set operator 610 and respective LINQ object 330, can be communicated to a database front-end housing system 630 in order to be executed on a non-relational data store 640. Additionally or alternatively, the grouping set operator 610 and respective LINQ object 330 can be communicated to a database front-end housing system 650 in order to be executed on a relational data store 660. Overall, the uniform representation of the LINQ object 330 can be communicated directly to a database front-end housing system for any arbitrary data source. The database front-end housing system 630 can be any suitable front-end system associated with the non-relational data store 640 that manages access. The database front-end housing system 630 can include various security and authentication techniques in order to ensure data privacy and integrity. Similarly, the database front-end housing system 650 can be any suitable front-end system associated with the relational data store 660 that manages access. The database front-end housing system 650 can include various security and authentication techniques in order to ensure data privacy and integrity.

In particular, the database front-end housing system 630 and/or the database front-end housing system 650 can manage incoming query requests (e.g., grouping set operator, key selector(s)) on the non-relational data store 640 and/or the relational data store 660, respectively. Thus, the translate component 110 can provide the query (e.g., the grouping set operator 610 and respective key selector(s)) and/or the LINQ object 330 to the database front-end housing system 630 and/or the database front-end housing system 650 in which either database front-end housing system utilizes such to execute the query on the respective data store (e.g., the non-relational data store 640, the relational data store 660). For example, the database front-end housing system 630 and/or the database front-end housing system 650 can include an internal query processor (not shown) that performs queries and returns results. Such internal query processor (not shown) can utilize the grouping set operator 610 and/or LINQ object 330 to execute such query on the non-relational data store 640 and/or the relational data store 660. In general, the grouping set operator and/or LINQ object 330 can execute on the engine 620, non-relational data store 640, and/or relational data store 660 regardless of a data connection there between. For instance, the non-relational data store 640, the engine 620, and/or the relational data store 660 can be cloud-based, server-based, wireless, hard-wired, and the like. In other words, the grouping set operator 610 and/or the LINQ object 330 can directly execute on the non-relational data store 640, the engine 620, and/or the relational data store 660 independent of a physical location (e.g., remote, local, any combination thereof, etc.) and/or data connection (e.g., cloud, wireless, local area network (LAN), any combination thereof, etc.).

Although FIG. 6 depicts a single non-relational data store 640, a single engine 620, and a single relational data store 660, it is to be appreciated and understood that any suitable number of non-relational data stores, engines, and/or relational data stores can be employed with the subject disclosure.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the translate component 110 or one or more sub-components thereof can employ such mechanisms to efficiently determine or otherwise infer function sequences (e.g., groupings, number of groupings, nested structures, other LINQ object characteristics discussed above, among others) to represent a grouping set operator that executes on non-relational data sources. By way of example and not limitation, the query processing system 100 or one or more sub-components thereof can employ such mechanisms to efficiently determine or otherwise infer which results to collect during a query that will satisfy an additional query to enable a lazy evaluation of queries.

Figure 7:
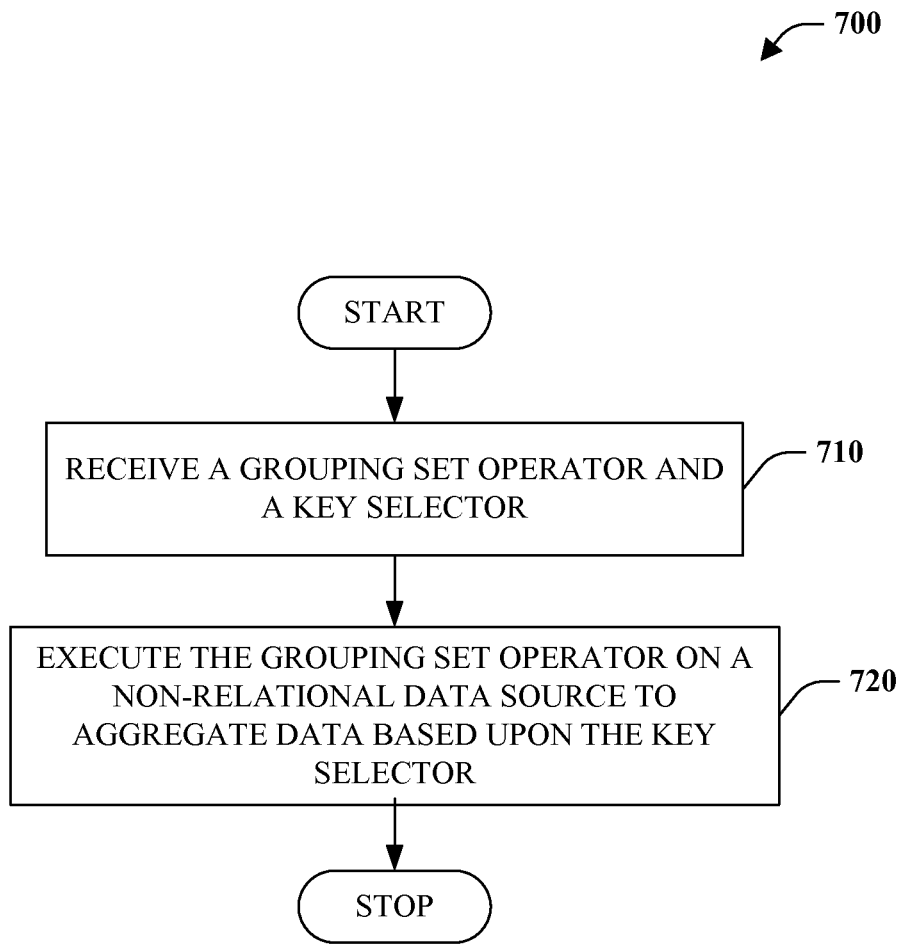
FIG. 7 is a flow chart diagram of a method of aggregating data based upon a grouping set operator and a key selector.
Figure 8:
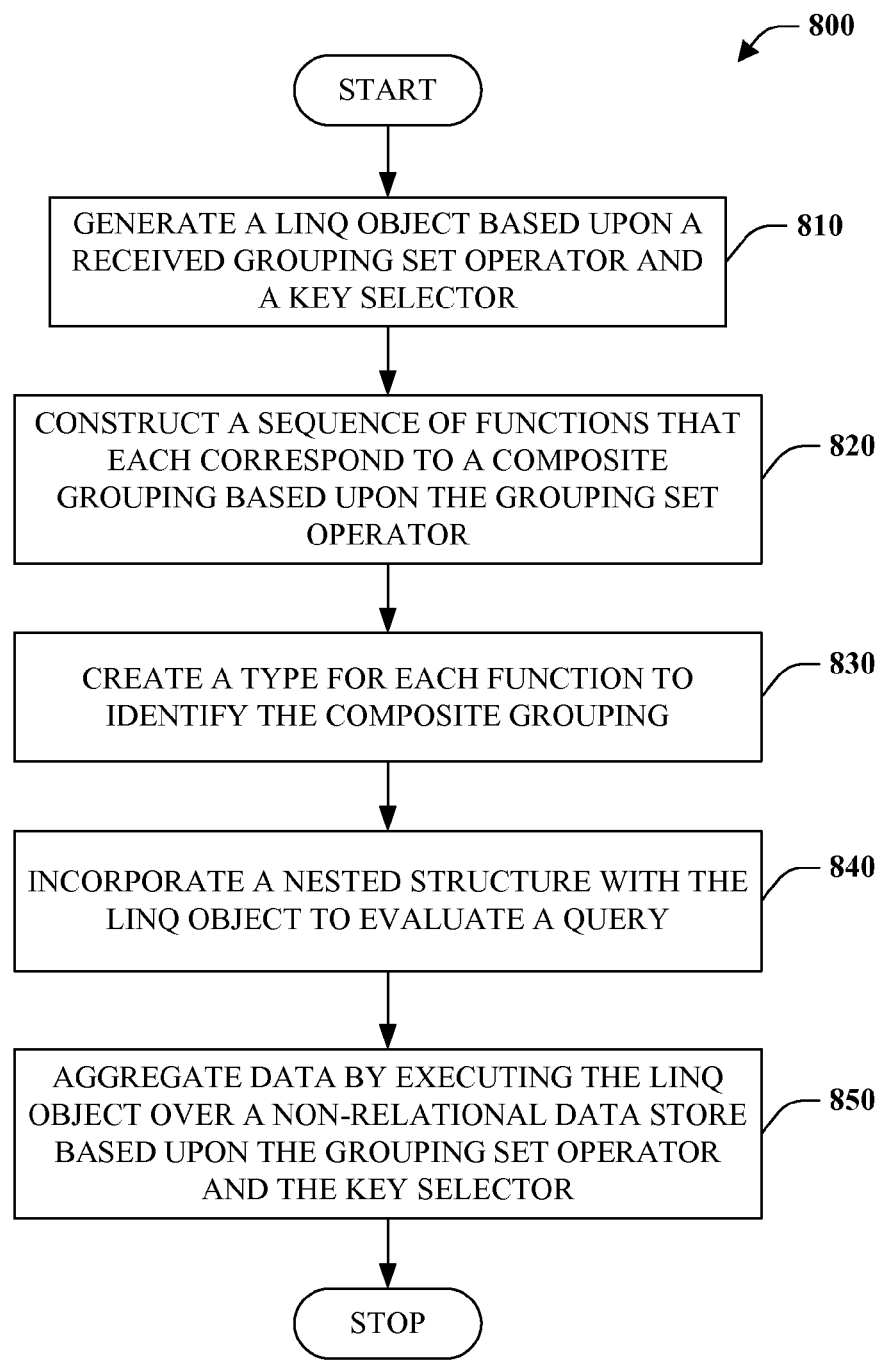
FIG. 8 is a flow chart diagram of a method generating a multidimensional LINQ object.

In view of the exemplary systems described supra, methodologies that may be implemented in accordance with the disclosed subject matter will be better appreciated with reference to the flow charts of FIGS. 7-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7, a method 700 of aggregating non-relational data based upon a grouping set operator and a key selector is illustrated. At reference numeral 710, a grouping set operator and a key selector can be received. In general, a portion of code can be evaluated in order to identify a grouping set operator that includes a key selector and a target data source. By way of example and not limitation, the portion of code can include a grouping set call (e.g., grouping set operator) with parameters that define the call such as at least one key selector and a target data source in which to perform such data aggregation. It is to be appreciated that the key selector can be any suitable function.

At reference numeral 720, the grouping set operator can be executed on a non-relational data source to aggregate data based upon the key selector. In other words, the grouping set operator, at least one key selector, and target data source can be performed on any arbitrary data source (e.g., relational data store, non-relational data source, among others) regardless of any multidimensional characteristics of such query. In particular, a multidimensional LINQ object can be generated for the grouping set operator that includes a sequence of functions that correspond to each grouping defined by such grouping set operator. Moreover, each function can be typed such that the type reflects which key selector(s) utilized for the grouping (e.g., the type of the function within the LINQ object corresponds to a definition of which key selectors generated such grouping).

FIG. 8 is a flow chart diagram of a method 800 of generating a multidimensional LINQ object that enables a grouping set operator to query a non-relational data source. At reference numeral 810, a LINQ object can be created based upon a received grouping set operator and a key selector. At reference numeral 820, a sequence of functions can be constructed that each correspond to a composite grouping based upon the grouping set operator. At reference numeral 830, a type is created for each function to identify the composite grouping. For example, each grouping set operator can define a number of composite groupings based upon the key selector(s) and each of these composite groupings can be typed for identification within the LINQ object.

At reference numeral 840, a nested structure can be incorporated with the LINQ object to evaluate a query. In other words, the generation of the LINQ object can be such that nested structures are included to allow efficient processing of querying. For instance, a LINQ object for a grouping set operator can be constructed to include various composite groupings based upon the key selector(s), wherein the execution of the various composite groupings can be efficiently performed to expose additional results that can be nested within the LINQ object. In other words, fetching results for a particular composite grouping can produce additional results which are included within the nested structured in the LINQ object.

At reference numeral 850, data can be aggregated by executing the LINQ object over a non-relational data store based upon the grouping set operator and the key selector. In particular, the grouping set operator is performed with the LINQ object executing over the non-relational data store in order to provide a result.

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
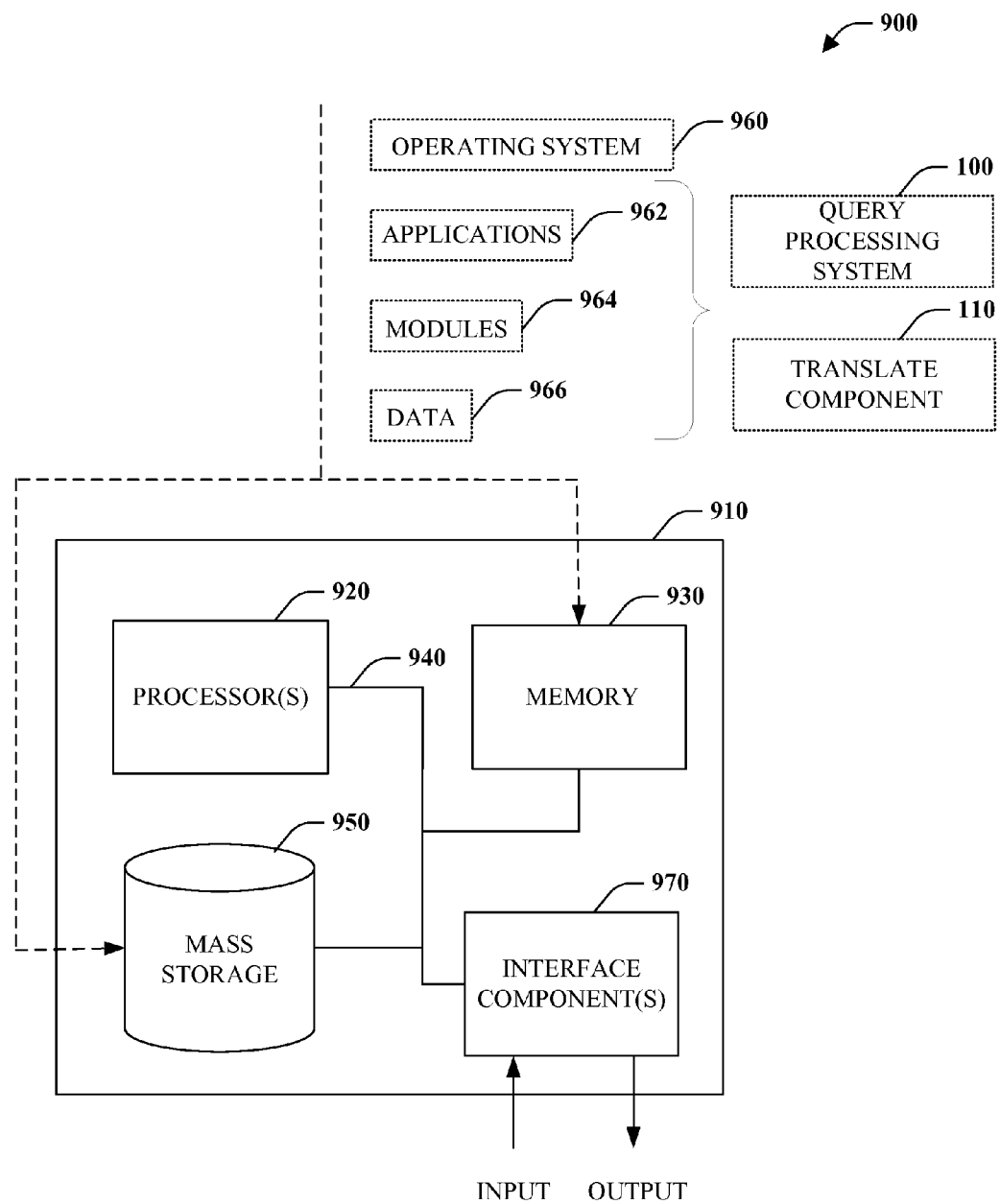
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the query processing system 100 and/or the translate component 110 can be, or form part, of an application 962, and include one or more modules 964 and data 966 stored in memory and/or mass storage 950 whose functionality can be realized when executed by one or more processor(s) 920, as shown.

In accordance with one particular embodiment, the processor(s) 920 can correspond to a system-on-a-chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the query processing system 100 and/or the translate component 110, and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method performed by a system comprising at least one processor coupled to a memory, storing machine-executable instructions, which when executed by the processor, control the system to perform acts comprising:
   receiving a query, over a non-relational data source, with multidimensional grouping specified in terms of multiple grouping sets, wherein a grouping set of the multiple grouping sets specifies one or more attributes by which to group data;
   producing a nested structure comprising functions configured to produce a union of groups specified by the multiple grouping sets, wherein the groups specified by the multiple grouping sets comprise groups of data with corresponding attributes; and
   generating an output in response to the received query by retrieving a subset of data from the non-relational data source based on the nested structure.

2. The method of claim 1 further comprises generating a multidimensional object based on the grouping sets.

3. The method of claim 2 further comprises generating the multidimensional object with a function that groups data based on at least one of a key or a combination of keys capturing the one or more attributes by which to group the data.

4. The method of claim 3 further comprises generating the multidimensional object with a "GroupBy" function.

5. The method of claim 4 further comprises creating the "GroupBy" function for each of the multiple grouping sets.

6. The method of claim 3 further comprises inserting a type to the function that references at least one of the key or the combination of keys that grouped the data.

7. A system that facilitates querying data, comprising:
   a processor coupled to a memory, the processor configured to execute computer-executable instruction stored in the memory that when executed perform actions comprising:
   receiving a query, over a non-relational data source, with multidimensional grouping specified in terms of multiple grouping sets, wherein a grouping set of the multiple grouping sets specifies a group in terms of zero or more keys;
   generating a multidimensional object from the query comprising a set of functions configured to aggregate data from the data source based the zero or more keys specified by the multiple grouping sets; and
   generating a nested output in response to the received query by retrieving a subset of data from the non-relational data source based on the set of functions.

8. The system of claim 7, at least one function of the functions includes a "GroupBy" operator.

9. The system of claim 7 further comprises assigning a type to each function of the set of functions, the type corresponds to a combination of keys from the zero or more keys that define a represented grouping set.

10. The system of claim 7 further comprises capturing nested structure in the multidimensional object.

11. The system of claim 7 further comprises mapping the multidimensional object to an online analytical processing (OLAP) engine format.

12. The system of claim 7, the grouping sets replicates a functionality of at least one of a "Rollup" operator or a "Cube" operator.

13. A computer-readable storage medium having instructions stored thereon that enable at least one processor to perform the following acts upon execution of the instructions:
- receiving, by a processor, a query, over a non-relational data source, including multidimensional grouping specified in terms of a grouping set operator configured to group data based on multiple grouping sets specified with the grouping set operator, wherein a grouping set of the multiple grouping sets includes zero or more keys by which to group the data; and
- producing a nested structure comprising functions configured to produce a union of groups specified by the multiple grouping sets, wherein the groups specified by the multiple grouping sets comprise groups of data with corresponding keys; and
- generating an output in response to the query by retrieving a subset of data from the non-relational data source based on the nested structure.

14. The computer-readable storage medium of claim 13 further comprises iteratively computing the grouping sets solely as needed to satisfy a user request identifying a particular grouping set of the multiple grouping sets.

15. The computer-readable storage medium of claim 14 further comprises initially computing a most specific grouping set specified by greatest number of keys.

16. The computer-readable storage medium of claim 15 further comprises computing a less specific grouping set from the most specific grouping set.

17. A method of querying data, comprising:
- receiving a language integrated query expression including a multidimensional grouping specified in terms of a grouping set operator configured to group and aggregate data from a data source in accordance with multiple grouping sets, wherein a grouping set of the multiple grouping sets includes one or more key selector functions by which to group the data;
- producing a nested structure comprising functions configured to produce a union of groups specified by the grouping set operator, wherein the groups comprise data of with corresponding key values; and
- generating an output in response to the received language integrated query expression by retrieving a subset of data from a non-relational data source based on the nested structure.

18. The method of claim 17 further comprises:
- evaluating a first function to produce a first group in the nested structure; and
- deferring evaluation of a second function to produce a second group in the nested structure until and unless results or the second function are needed to satisfy a user request for the second group.

19. The method of claim 18, evaluating the second function further comprises employing results produced by evaluating the first function.

* * * * *